United States Patent [19]

Hayes et al.

[11] Patent Number: 5,041,920

[45] Date of Patent: Aug. 20, 1991

[54] IMAGE HALFTONE GENERATION BY STATIC RAM LOOK-UP TABLE

[75] Inventors: Thomas A. Hayes, Clifton Springs; James W. Stevens, Rochester, both of N.Y.

[73] Assignee: Xerox Corporation, Stamford, Conn.

[21] Appl. No.: 436,856

[22] Filed: Nov. 15, 1989

[51] Int. Cl.⁵ ............................................... H04N 1/40
[52] U.S. Cl. .................................... 358/456; 358/455; 358/460; 358/465
[58] Field of Search ............... 358/455, 456, 457, 458, 358/460, 461, 462, 465, 466

[56] References Cited

U.S. PATENT DOCUMENTS

| | | | |
|---|---|---|---|
| 4,430,748 | 2/1984 | Tuhro et al. | 382/50 |
| 4,661,859 | 4/1987 | Mailloux et al. | 358/283 |
| 4,706,077 | 11/1987 | Roberts et al. | 340/728 |
| 4,709,274 | 11/1987 | Tanioka | 358/283 |
| 4,719,516 | 1/1988 | Nagashima | 358/780 |
| 4,736,254 | 4/1988 | Kotera et al. | 358/283 |
| 4,755,813 | 7/1988 | Williams | 340/799 |
| 4,763,199 | 8/1988 | Suzuki | 358/280 |
| 4,800,442 | 1/1989 | Riseman et al. | 358/280 |
| 4,866,533 | 9/1989 | Nagashima | 358/456 |

Primary Examiner—Joseph A. Orsino
Assistant Examiner—Thomas D. Lee
Attorney, Agent, or Firm—Frederick E. McMullen

[57] ABSTRACT

A halftone conversion system for converting digital pixels to binary pixels in which individual matrices in a memory having progressively changing x, y matrices of binary pixels are addressed by an address composed of a block of x pixels including the pixel being processed, a block of y lines including the line containing the pixel being processed, and the digital value of the pixel being processed, the pixel located at the x, y coordinates of the addressed matrix providing the binary pixel output.

6 Claims, 3 Drawing Sheets

IMAGE HALFTONE GENERATION BY STATIC RAM LOOK-UP TABLE

The invention relates to a halftone conversion process for converting digital image signals pixels to binary, and more particularly, to an improved halftone conversion process using a static RAM look-up table.

When it is desired to digitally scan and reproduce an image which consists of continuous tones (i.e., grey shades), the usual method to reproduce the grey shades contained in the image is to apply a halftone screen to the image. This screen is a matrix of binary threshold values which is overlayed on a corresponding matrix of pixels contained within the scanned image.

In one implementation, a look-up table in ROM is used to hold the halftone cell matrix threshold values. The threshold for a selected pixel within the cell is passed through a digital to analog converter and, using an analog comparator, compared directly to the analog output of the scanner's CCD array. However, this implementation lacks the ability to modify the density input/output characteristics of the system due to the fact that the halftone screen threshold values are fixed in hardware.

In another implementation, a hardware state machine fills the cell matrix based on location within the cell and input scan data value for the image pixel associated with the cell location. While this implementation can operate at a high speed without a large quantity of electronic hardware, once programmed it is difficult to modify. Also, where it is desired to implement a family of density input/output characteristics, the amount of hardware required is large, with attendant high cost.

In the prior art U.S. Pat. No. 4,736,254 to Kotera et al disclose a thresholding system in which a matrix of threshold values is addressed in response to each print position, the threshold values obtained being compared with the grey scale value of the image signals representing the original image to provide binary image signals. U.S. Pat. No. 4,706,077 to Roberts et al is similar to Kotera et al above in the provision for storing in RAM threshold values which on comparison with image signals produces various halftone patterns for use in a xerographic printer. U.S. Pat. No. 4,709,274 to Tanioka discloses a image processing apparatus in which the type of image is determined, with subsequent binarizing or dither processing selected in response thereto. And U.S. Pat. No. 4,719,516 to Nagashima discloses an image processing apparatus in which the processing program is stored in detachable non-volatile memory.

Further, U.S. Pat. No. 4,430,748 to Tuhro et al discloses an image thresholding system in which a ROM look-up table having thresholded values therein is used, the table being addressed by a pixel address made up of the pixel when processed and neighboring pixels, providing a threshold value for the pixel. U.S. Pat. No. 4,800,442 to Risman et al discloses a system for gamma correcting a digital image signal using a digital look-up table to provide a high quality image output. U.S. Pat. No. 4,755,813 to Williams discloses a programmable screening circuit for use in screening image pixels, while U.S. Pat. No. 4,661,859 to Mailloux et al discloses a halftone generating system adapted to provide a pulse width modulated signal of predetermined length in response to the grey scale level of the input pixels. And U.S. Pat. No. 4,763,199 to Suzuki discloses an image processing apparatus for changing the image data characteristics.

In contrast, the present invention provides a method for converting lines L of input pixels P representing an image in digital form to output pixels in binary form, comprising the steps of: (a) storing a succession of progressively changing binary pixel matrices x pixels wide and y lines long in memory; (b) for each input pixel P in each line L, providing a memory address composed of a block of x pixels including the pixel P, a block of y lines including the line L in which the pixel P resides, and the digital value of the pixel P; (c) addressing the memory with the address from step b to access the pixel matrix corresponding to the address; and (d) from the pixel matrix obtained in step c, selecting a predetermined one of the pixels in the matrix as the binary output pixel representative of the pixel P.

IN THE DRAWINGS

Figure 1:
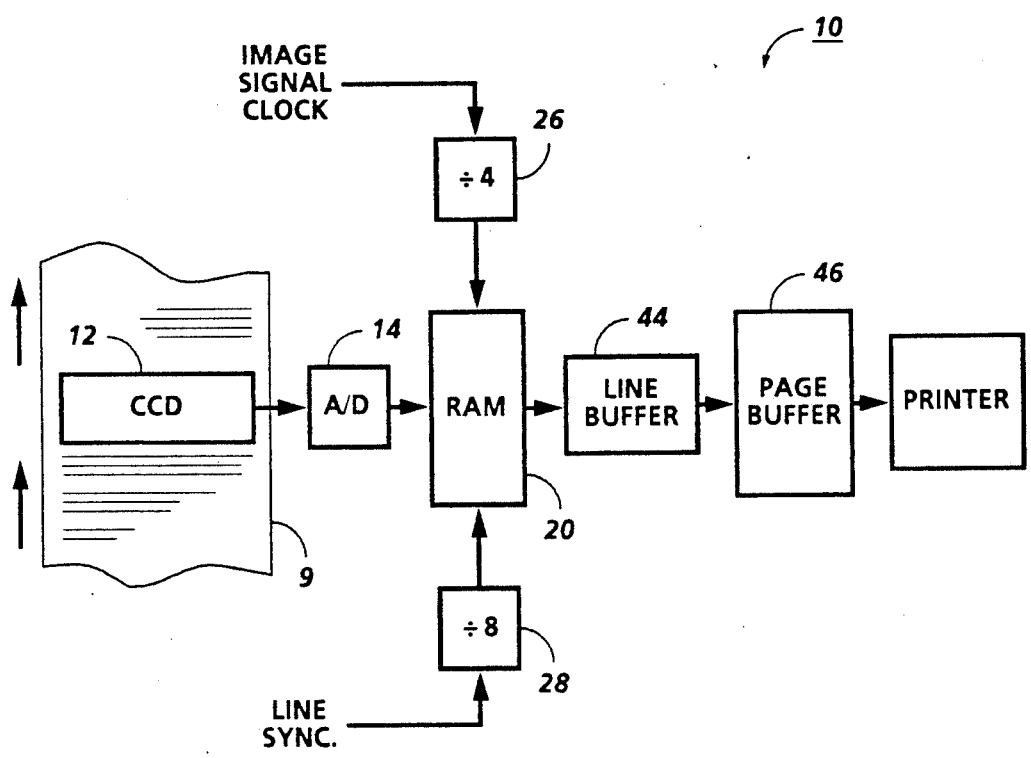
FIG. 1 is a schematic view illustrating the component parts of the halftone conversion system of the present invention.
Figure 2:
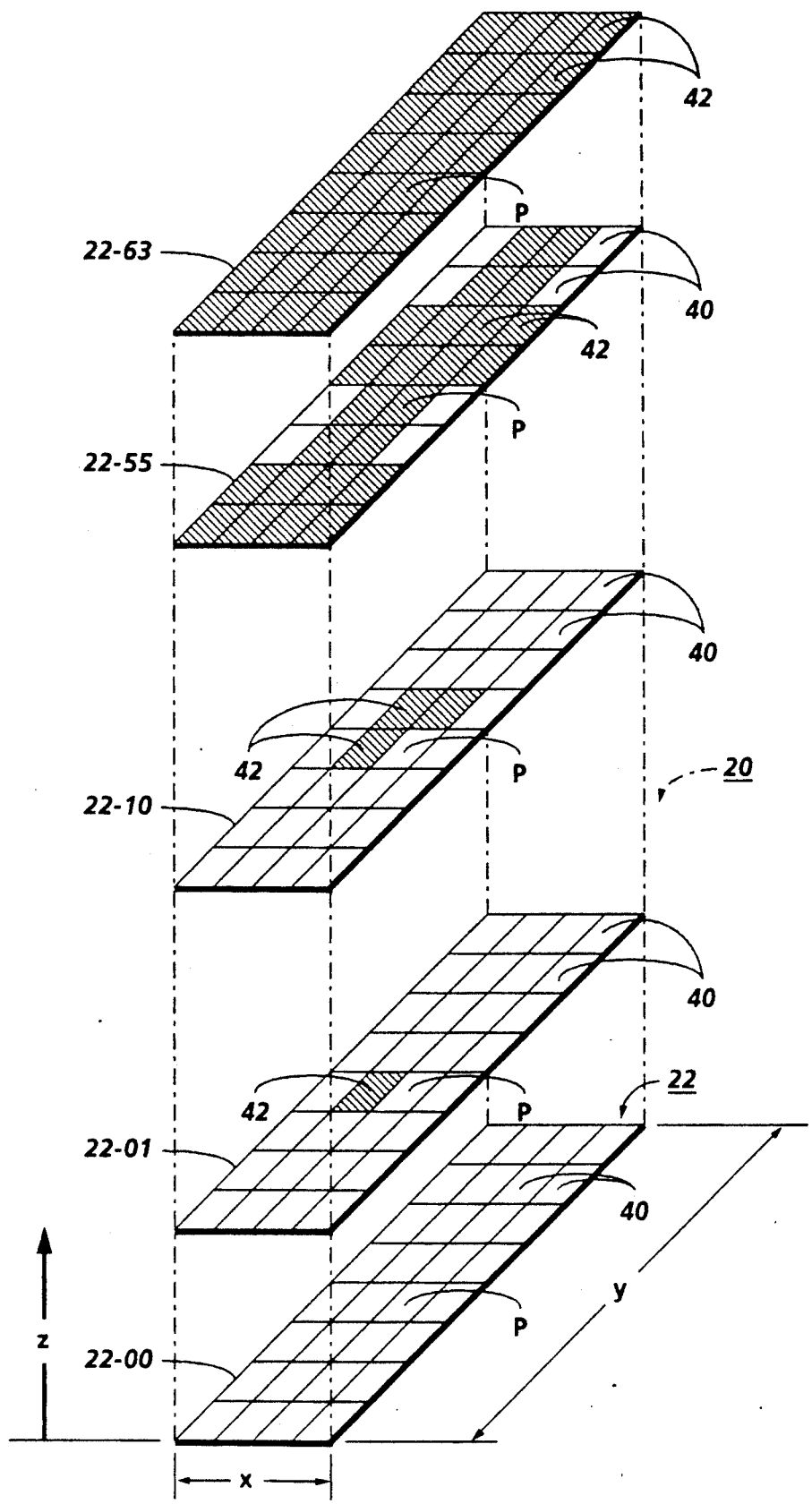
FIG. 2 is an isometric view depicting various pixel matrix examples.
Figure 3:
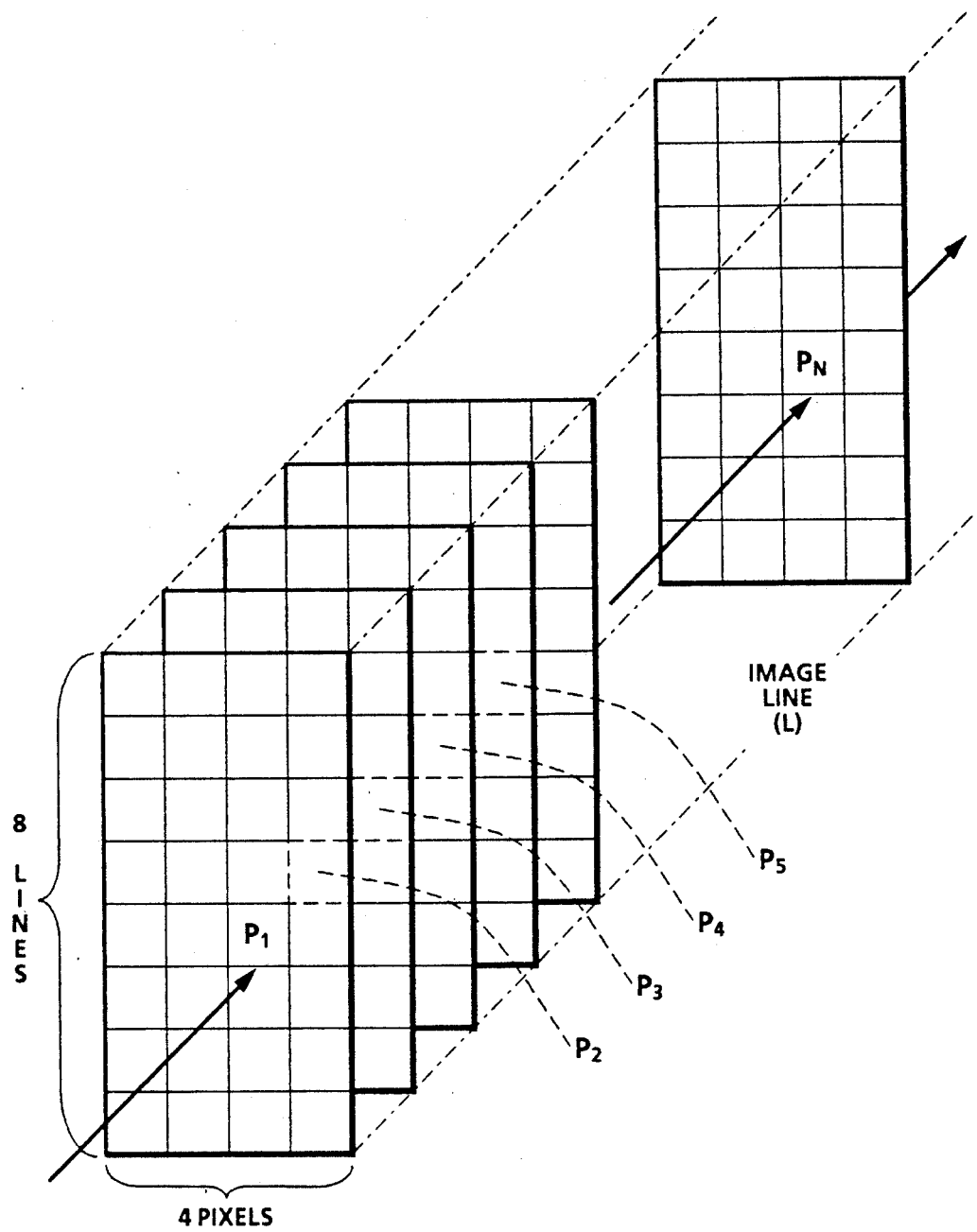
FIG. 3 is an isometric view illustrating the manner in which a succession of pixels are processed using the halftone conversion system of the present invention.

Referring to FIGS. 1-3, analog image signals from a solid state pick up device 12 (i.e., a CCD) as the device 12 scans an image bearing document 9 are quantified into N level digital image signals by A/D converter 14. N may, for example, comprise 63 levels of 6 bit digital image signals. To convert the digital image signals to halftone values for printing or other processing, the halftone conversion system 10 of the present invention is employed.

Halftone conversion system 10 includes a static Random Access Memory (RAM) 20 which as will appear functions as a look-up table. RAM 20 contains a series of different patterned halftone cell matrices 22, each matrix 22 comprising an x pixel-by-y image line. In the ensuing description, for purposes of explanation, x is 4 pixels long while y is 8 lines wide.

Referring particularly to FIG. 2, RAM 20 may be thought of as a 3-dimensional block or cube in which the x, y dimensions are 4 pixels (x) and 8 image lines (y) respectively. The z dimension is the pixel image density represented by the digital image signal output of A/D converter 14. Accordingly, as will appear, the x, y, z points combine to form a specific address to RAM 20 for each image pixel P.

As can be seen from FIG. 2 of the drawings and using the number of levels N as equal to 63, the cell patterns of matrices 22 vary from a matrix 22-0 with all white cells 40 at the first address location to a matrix 22-63 with all black cells 42 at the last address location in RAM 20. Intermediate cell matrices 22-1 . . . 22-62 are formed by various combinations of white cells 40 and black cells 42. It is understood that where the number N of levels is different, the number and content of matrices 20 will be different.

Each pixel P is processed individually and in sequence by forming a specific address comprised of a block of 4 pixels in succession (including the pixel P being processed), a block of 8 image lines in succession (including the image line L in which the pixel P being processed lies), and the 6 bit digital signal output of A/D converter 14 representing the image density of the pixel P being processed. The address obtained is used to address a specific matrix 22 in RAM 20 from which the halftone value for the pixel P being processed is determined in the context of the addressed matrix.

Referring to FIG. 1 and the example described where x=4, y=8, and z=6, the digitally converted image signals output by AD converter 14 together with the x count and the y count signals derived from a divide-by-4 counter 26 and a divide-by-8 counter 28 respectively, combine to form an 18 bit address for RAM 20. Divide-by-4 counter 26 in effect forms the line L of image signals being processed into successive blocks of 4 pixels each as seen in FIG. 3, each successive block being offset by one pixel. The pixel P being processed is preferably the third pixel in the block of 4 pixels. Counter 26 is driven by the image signal clock to maintain synchronization with the rate at which image signals are input. Divide-by-8 counter 28 in effect forms the image lines into successive blocks of 8 lines each, counter 28 being driven by a line sync signal to maintain synchronization with the lines of image data. The line L containing the pixel P being processed is preferably the fifth line in the block of 8 lines. Accordingly, the coordinates of pixel P are x=3 and y=5.

The address provided for each pixel P, which provides a context of neighboring pixels in the same line and in adjoining lines of the pixel P being processed, is used to address RAM 20 and obtain the particular matrix 22 associated with that address. From the addressed matrix, the halftone value for the pixel P being processed is obtained. Preferably, the halftone value used is for the pixel in the addressed matrix at the location in the matrix specified by the x and y coordinates of the pixel P being processed. Accordingly, in the example discussed where pixel P is the third pixel in the fifth line, the halftone value of the third pixel in the fifth line of the addressed matrix forms the binary output pixel.

As will be understood, however, binary pixel values at different coordinates in the addressed matrix may instead by chosen as the output pixel.

The halftone pixel values obtained are input to a suitable line buffer 44 such as a RAM for temporary storage until processing of the remaining pixels in the line is completed. Following processing of the last pixel in the line, the line of processed pixels is transferred from buffer 44 to a suitable page buffer 46. There, the lines of processed pixels are stored until processing of the last pixel in the last line is completed. The finished page or pages may then be output to a suitable output station such as a printer for use.

While the invention has been described with reference to the structure disclosed, it is not confined to the details set forth, but is intended to cover such modifications or changes as may come within the scope of the following claims.

We claim:

1. A method for converting lines L of input pixels P representing an image in digital form to output pixels in binary form, comprising the steps of:

a) storing a succession of progressively changing binary pixel matrices x pixels wide and y lines long in memory;

b) for each input pixel P in each line L, providing a memory address composed of a block of x pixels including a representation of said pixel P, a block of y lines including the line L in which said representation of said pixel P resides, and a digital value of said pixel P;

c) addressing said memory with the address from step b to access a pixel matrix corresponding to said address; and d) from the pixel matrix obtained in step c, selecting a predetermined one of the pixels in said matrix as a binary output pixel representative of said pixel P.

2. A method for halftone processing multi-bit input pixels to provide a binary output pixel for each of said input pixels, comprising the steps of:

a) storing discrete x, y halftone pixel matrices in a memory;

b) for each input pixel, providing a composite address comprised of a block of x pixels including a said input pixel, a block of y image lines including the line containing said representation of said input pixel, and a digital image value of said input pixel;

c) using said composite address, addressing a predetermined one of said x, y halftone pixel matrices in said memory; and d) from the x, y matrix addressed in step b, outputting a binary representation of a predetermined one of the pixels in said addressed matrix as said binary pixel output for said input pixel.

3. The method according to claim 2 including the step of:

outputting binary representation of the pixel at the x, y coordinates of said matrix which define said input pixel.

4. The method according to claim 2 including the step of:

indexing said block of x pixels by one for each succeeding into pixel to be processed.

5. The method according to claim 4 including the step of:

indexing said block of y image line by one when processing of a last input pixel in the line is completed.

6. An image signal conversion process for converting input pixels from digital to binary, comprising the steps of:

a) storing progressively changing halftone matrices of binary pixels in memory, each of said matrices comprising a matrix x pixels wide and y pixels long;

b) for each of said digital pixels, providing a composite address for addressing a predetermined one of said matrices in said memory comprising a block x pixels wide, y lines long, and a digital value of said pixel;

c) using said address, addressing said memory to obtain a halftone matrix corresponding to said address from said memory; and d) from the halftone matrix obtained in step c, selecting a binary pixel in said matrix corresponding in position to x, y coordinates of said input pixel.

* * * * *